United States Patent Office 3,794,667
Patented Feb. 26, 1974

3,794,667
ISOCYANATO-P-QUINONES
Ulrich von Gizycki, Cologne, Germany, assignor to Bayer Aktiengesellschaft, Leverkusen, Germany
No Drawing. Filed Jan. 28, 1972, Ser. No. 221,794
Claims priority, application Germany, Feb. 5, 1971,
P 21 05 489.7
Int. Cl. C07c 119/04
U.S. Cl. 260—396 R     3 Claims

ABSTRACT OF THE DISCLOSURE

Isocyanates having the formula

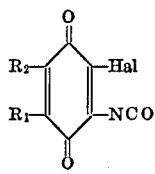

in which Hal is fluorine, chlorine or bromine and $R_1$ and $R_2$ are the same or different and are hydrogen, fluorine, chlorine, bromine, a cyano group or one of $R_1$ and $R_2$ is an isocyanato group or $R_1$ and $R_2$ together form an anellated aromatic ring are provided and a process for preparing them in which the corresponding amino-p-quinone is reacted in an inert organic solvent with at least 1 mol of oxalyl chloride per mol of amino groups while heating under reflux conditions until the evolution of gas ceases. The isocyanates of this invention are useful in the production of polyurethanes, dye-stuffs, plant protection agents and pharmaceuticals.

---

This invention relates to halogen-substituted mono- and di-isocyanato-p-quinones, to a process for their production and to the use of the diisocyanato quinones in the production of polyurethanes.

p-Quinones containing one or more NCO groups on the quinoid nucleus have hitherto been unknown. The method normally used for the production of isocyanates, namely phosgenating corresponding amino compounds, does not lead to the formation of isocyanates when applied to amino- and diamino-quinones. Neither does the reaction of unsubstituted amino- and diamino-aquinones with oxalyl chloride lead to the corresponding isocyanates. For this reason, it must be regarded as extremely surprising that, as has now been found, mono- and di-isocyanato-p-quinones can be obtained, in a smooth reaction, by reacting mono- or diamino-quinones carrying a halogen substituent in the position adjacent to the amino function, with an excess of oxalyl chloride.

Accordingly, the present invention relates to a process for the production of isocyanates having the general formula:

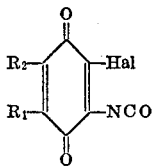

in which

Hal represents a fluoride, chlorine or bromine atom, and $R_1$ and $R_2$, which may be the same or different, each represents a hydrogen, fluorine, chlorine or bromine cyano group, or one of the radicals $R_1$ or $R_2$ represents an isocyanato group, or $R_1$ and $R_2$ together represent an anellated aromatic ring.

The invention also relates to a process for the production of mono- and di-isocyanato-p-quinones, in which a mono- or di-amino-p-quinone carrying a halogen substituent in a position adjacent to at least one amino group, is reacted in an inert organic solvent, optionally under pressure, with at least 1 mol, preferably with 1.5 to 3.5 mols, of oxalyl chloride per mol of amino groups, at a temperature of from 0 to $+250°$ C.

Finally, the invention also relates to the use of the aforementioned isocyanates as reaction components in the production of polyurethane plastics by the isocyanate-polyaddition process.

The process according to the invention is illustrated by way of example by the following reaction:

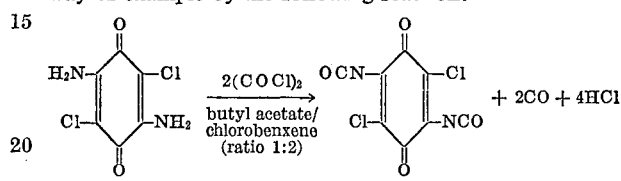

Starting materials suitable for use in the process according to the invention include substituted amino- and di-amino-p-quinones corresponding to the general formula:

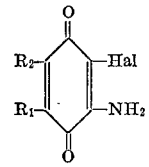

in which

Hal represents a fluorine, chlorine or bromine atom, and $R_1$ and $R_2$, which may be the same or different, each represents a hydrogen, fluorine, chlorine or bromine atom, cyano group, or one of the radicals $R_1$ or $R_2$ represents an amino group, or $R_1$ and $R_2$ together represent an anellated aromatic ring.

These compounds are the preferred starting materials for the process of the invention. However, the process of the invention may also be carried out using aminoquinones of above general formula in which $R_1$ and $R_2$ may be the same or different, each represents a $C_1$ to $C_{12}$ alkyl group, $C_5$ to $C_{12}$ cycloalkyl group, nitro group, $C_1$ to $C_4$ halogenalkyl group, or a carboalkoxy, alkylcarbonyl, arylcarbonyl, aryloxy, alkyl mercapto or aryl mercapto groups, or in which $R_1$ and $R_2$ together form part of an anellated heterocyclic ring, i.e. one containing oxygen, sulphur or nitrogen. If the process of the invention is carried out with such aminoquinones, isocyanato quinones are obtained which contain the corresponding substituents.

Specific examples of preferred starting materials for the process according to the invention include 2-chloro-3-amino-p-benzoquinone;
2,5-diamino-3,6-dichloro-p-benzoquinone;
2,5-dichloro-3,6-diamino-p-benzoquinone;
2,6-dichloro-3,5-diamino-p-benzoquinone;

the corresponding bromine- and fluorine-substituted aminoquinones;

2-chloro-3-amino-p-benzoquinone;
2-bromo-3-amino-5-fluoro-6-amino-p-benzoquinone;
2-fluoro-3-amino-5-bromo-6-methyl-p-benzoquinone;
2-amino-3-chloro-1,4-naphthoquinone;
2-amino-3-fluoro-4-cyano-p-benzoquinone;
2,5-diamino-3,6-dicyano-p-benzoquinone.

Especially preferred starting materials for the process according to the invention are 2,5-diamino-3,6-dichloro-p-benzoquinone and 2-amino-3-chloro-1,4-naphthoquinone.

In general, the reaction is distinguished by the fact that it is extremely easy to carry out, because the starting components need only be combined in a suitable organic solvent or solvent mixture, and heated under reflux until the evolution of gas ceases. The corresponding isocyanates are then isolated by filtration, or by concentrating the solvent by evaporation.

In general, the process according to the invention is carried out at a temperature of from 0 to 250° C., preferably at a temperature of from 40 to 150° C., using a 1 to 5 fold, preferably a 1.5 to 3.5 fold, molar excess of oxalyl chloride, based on the amino groups present, optionally under pressure.

Suitable solvents for use in the process according to the invention include any solvents inert towards starting materials and products of the invention, for example benzene, toluene, xylene, chlorobenzene, dichlorobenzenes, benzene, toluene, xylene, chlorobenzene, dichlorobenzenes, ethyl acetate, butyl acetate, methyl ethyl ketone, methyl isobutyl ketone, acetonitrile and cyclohexane, etc. The mono- and di-isocyanato quinones obtainable by the process according to the invention are yellow to red crystalline compounds.

By carrying out the process of the invention using above preferred aminoquinones as starting materials, following isocyanatoquinones may be obtained:

2,5-diisocyanato-3,6-dichloro-p-benzoquinone;
2,5-dichloro-3,6-diisocyanato-p-benzoquinone;
2,6-dichloro-3,5-diisocyanato-p-benzoquinone;

the corresponding bromine- and fluorine-substituted isocyanatoquinones;

2-chloro-3-isocyanato-p-benzoquinone
2-bromo-3-isocyanato-5-fluoro-6-isocyanato-p-benzoquinone;
2-fluoro-3-isocyanato-5-bromo-6-methyl-p-benzoquinone;
2-isocyanato-3-chloro-1,4-naphthoquinone;
2-isocyanato-3-fluoro-4-cyano-p-benzoquinone;
2,5-diisocyanato-3,6-dicyano-p-benzoquinone.

Preferred products of the invention are: 2,5-diisocyanato-3,6-dichloro-p-benzoquinone and 2-isocyanato-3-chloro-1,4-naphthoquinone.

By virtue of the free isocyanate groups present in them, the compounds according to the invention are suitable for use as reactants in the production of polyurethane plastics by the isocyanate-polyaddition process. The polyisocyanates used in known manner for the synthesis of polyurethanes can be replaced either wholly or in part by the isocyanates according to the invention. 2,5-diisocyanato - 3,6 - dichloro-p-benzoquinone is a preferred representative of the isocyanates according to the invention for use as a reactant in the synthesis of polyurethane plastics.

In the synthesis of polyurethanes in accordance with the invention, using the isocyanates according to the invention, it is possible to use any of the compounds known in polyurethane chemistry having at least two groups that are reactive with isocyanate groups, for example glycols, diamines and hydroxyl-group-containing polyethers or polyesters, etc. It is also possible to use the additives and acids normally employed in polyurethane chemistry.

Specific examples of compounds having at least two groups that are reactive with isocyanate groups are low molecular polyols such as ethylene glycol, propylene glycol, glycerol, trimethylolpropene or higher molecular weight polyols, such as polyester polyols obtained by reacting a molar excess of e.g. above low molecular polyols with polycarboxylic acids such as phthalic acid or adipic acid. Suitable reactants, additives, catalysts and reaction conditions, which may be employed in the reaction for the preparation of polyurethanes in accordance with the invention are mentioned in U.S. Pat. 3,201,372. U.S. Pat. 3,350,362 discloses polyisocyanates which can be used in conjunction with the isocyanates of the invention as desired. Specific examples of such additional polyisocyanates include hexamethylene-diisocyanate, 4,4'-diisocyanato-diphenylmethane, 2,4-diisocyanatotoluene, 2,6-diisocyanatotoluene or 1,5-diisocyanatonaphthalene.

The polyurethanes produced in accordance with the invention using the isocyanates according to the invention, especially diisocyanates, contain p-quinone units and, for this reason, can be used as so-called redox polymers. The polyurethanes containing novel p-quinone units can be used with advantage, for example, as a solid resin with oxidizing properties, while the corresponding hydrogenated polyurethanes can be used as a solid resin with reducing properties, for example in columns built up in the same way as ion-exchanger columns.

The quinone isocyanates obtainable by the process according to the invention can also be used in the production of dye-stuffs, plant protection agents and pharmaceutical preparations.

EXAMPLE 1

2,5-diisocyanato-3,6-dichloro-p-benzoquinone

A mixture of 100 g. of 2,5-diamino-3,6-dichloro-p-benzoquinone, 400 g. of oxalyl chloride, 200 ml. of absolute n-butyl acetate and 550 ml. of anhydrous chlorobenzene is heated under reflux (for some 36 hours) until the evolution of gas ceases. After cooling and standing for 12 hours at 0° C., the reaction mixture is filtered under suction through a coarse frit and washed with absolute ether, giving 60 g. of 2,5 - diisocyanato-3,6-dichloro-p-benzoquinone in the form of red crystals melting at 259 to 260° C.

Molecular weight as determined by mass spectroscopy: 258 in the form of $RCl_2$ (Cl=35); calculated: 258
Bis-thyl urethane: Orange needles melting at 220 to 221° C.

EXAMPLE 2

2-isocyanato-3-chloro-1,4-naphthoquinone

A mixture of 50 g. of 2-amino-3-chloro-1,4-naphthoquinone, 200 g. of oxalyl chloride and 500 ml. of anhydrous o-dichlorobenzene is heated under reflux until the evolution of gas ceases (approximately 15 hours). After cooling to about 30° C., the reaction mixture is filtered through a fine frit and the filtrate is concentrated in vacuo to about one third of its original volume. 2-isocyanato-3-chloro-1,4-naphthoquinone crystallizes out in the form of yellow crystals on cooling to 0° C. After filtration under suction, the product is washed with absolute benzene.

Yield: 40 g.; M.P.: 140 to 142° C.
Molecular weight as determined by mass spectroscopy: 233 in the form of $RCl$ (Cl=35); calculated: 233.
Ethyl urethane: Yellow needles melting at 135 to 136° C.

EXAMPLE 3

Preparation of a polyurethane from glycol and 2,5-diisocyanato-3,6-dichloro-p-benzoquinone 6.5 g. of 2,5-diisocyanato-3,6-dichloro-p-benzoquinone are dissolved under heat in 150 ml. of anhydrous acetonitrile followed by the dropwise addition with stirring to the cooled solution of 1.55 g. of glycol dissolved in 10 ml. of acetonitrile (dropwise addition time 30 minutes). After 20 hours at room temperature and 8 hours at 0° C., the resulting orange-colored precipitate is filtered under suction and washed with hot acetone.

Yield of polyurethane: 8 g.
M.P.: approximately 255° C. (decomposition).
Analysis: C, 37.1%; N, 8.6%; Cl, 21.6%.
Calculated for 1:1 polymer: C, 37.4%; N, 8.7%; Cl, 22.1%.

EXAMPLE 4

Reduction of the polyurethane of 2,5-diisocyanate-3,6-dichloro-p-benzoquinone and glycol according to Example 3

15 g. of the polyurethane are dissolved in the absence of heat in 300 cc. of dimethyl sulphoxide, followed by the addition of 30 cc. of water. $SO_2$ is slowly passed through the reaction mixture with stirring at room temperature. The clear dark brown solution turns almost colorless over a period of 6 hours. When the color of the solution shows no further signs of brightening, the solution is treated with fuller's earth or with active carbon, filtered, and slowly added dropwise with intensive stirring to 1.5 litres of water. The colorless precipitate which accumulates is filtered under suction, washed thoroughly with water and dried in vacuo over $P_2O_5$. Decomposition above 300° C.

Yield: 60%
Analysis: C, 36.5%; H, 3.2%; N, 7.5%; Cl, 19.6%.

EXAMPLE 5

The use of the hydrogenated polyurethane of 2,5-diisocyanato-3,6-dichloro-p-benzoquinone and glycol as a hydrogen resin 3 g. of the reduced colorless polyurethane (cf. Example 4) are intimately mixed in a mortar with 1 g. of p- benzoquinone and the resulting mixture is subsequently boiled under reflux for 30 minutes in absolute benzene/ acetonitrile (50 ml. 1:1). The reaction mixture is then filtered off from the polymer under heat and the hydroquinone formed is isolated from the filtrate.

What is claimed is:
1. An isocyanate having the formula:

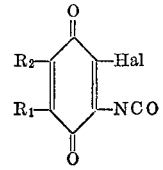

in which Hal is fluorine, chlorine or bromine and $R_1$ and $R_2$ are the same or different and are hydrogen, fluorine, chlorine, bromine, a cyano group or one of $R_1$ and $R_2$ is an isocyanato group and the other is as defined above or $R_1$ and $R_2$ together form an anellated benzene ring.
2. 2,5-diisocyanato-3,6-dichloro-p-benzoquinone.
3. 2-isocyanato-3-chloro-naphthoquinone.

References Cited
UNITED STATES PATENTS
2,261,156  11/1941  Hentrich et al. _____260—453 P VIVIAN GARNER, Primary Examiner U.S. Cl. X.R.

260—77.5 AP, 77.5 AT, 297 B, 326.5 B, 326.5 J, 332.3 P, 345.2, 346.2 R